Nov. 7, 1939.  W. P. WOODS ET AL  2,178,734
WHEEL MOUNTING FOR AUTOMOBILES
Filed June 6, 1938  3 Sheets-Sheet 1

Inventors
Warren P. Woods
Walter E. Smith
By Clarence A. O'Brien
and Hyman Berman
Attorneys

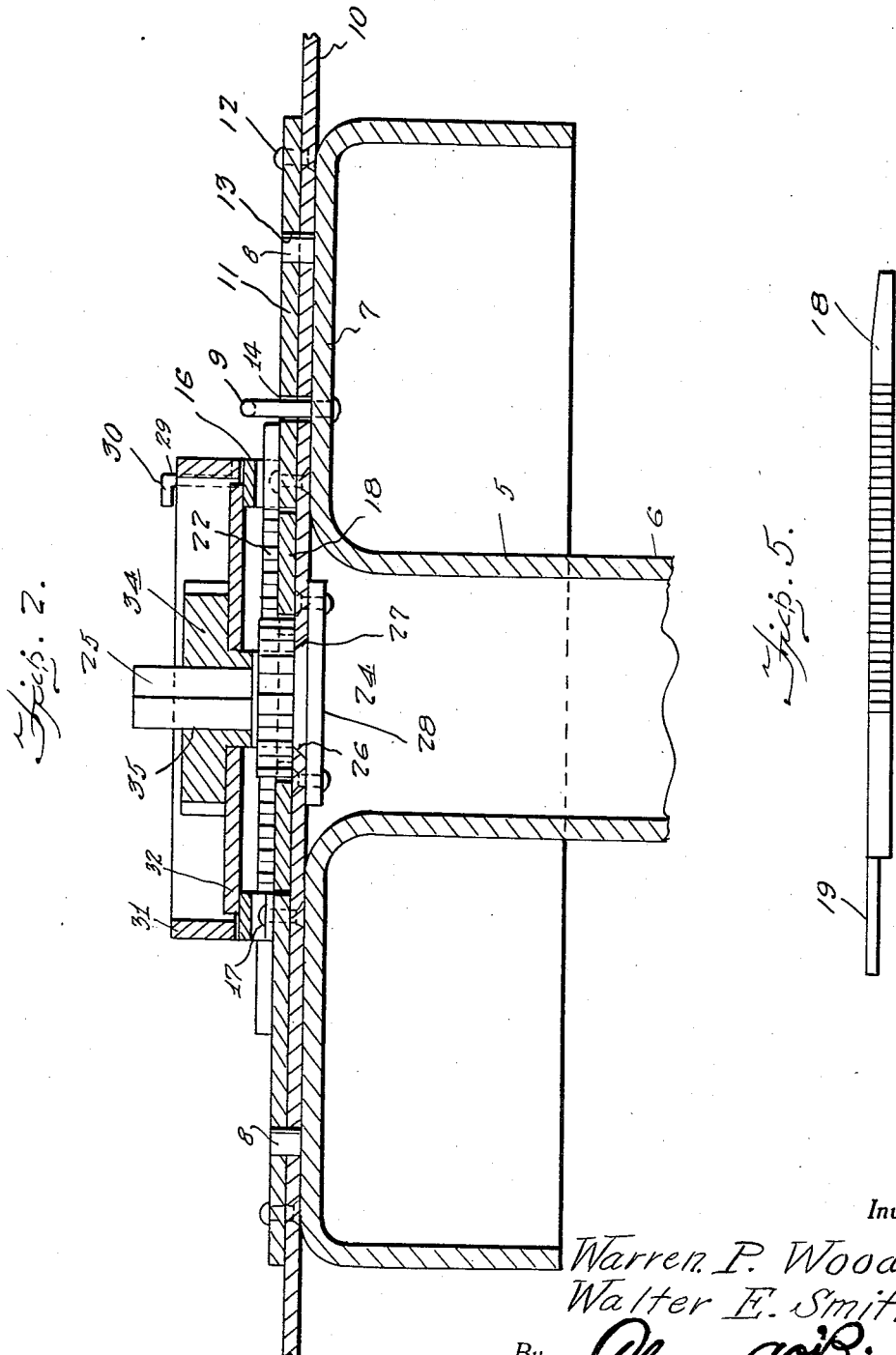

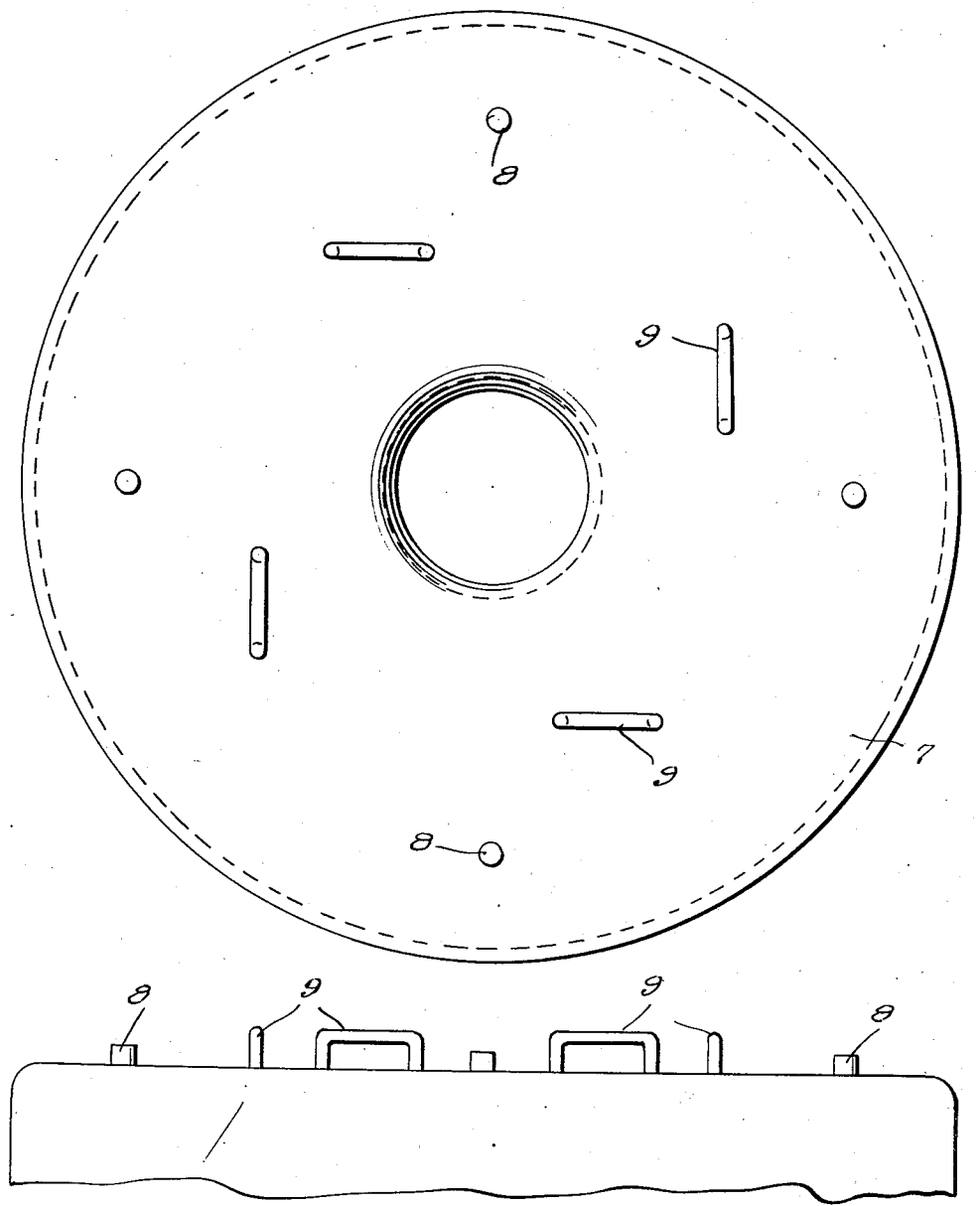

Patented Nov. 7, 1939

2,178,734

UNITED STATES PATENT OFFICE 2,178,734

WHEEL MOUNTING FOR AUTOMOBILES

Warren P. Woods and Walter E. Smith, Vienna, Ill.

Application June 6, 1938, Serial No. 212,141

3 Claims. (Cl. 301—9)

The present invention relates to wheel mountings for automobiles and similar vehicles and has for its primary object to provide an axle assembly to which the wheel may be releasably secured, the assembly embodying a plurality of staples and the wheel embodying a plurality of slidably mounted locking bolts adapted to engage the staples to secure the wheel in position on the assembly, together with rack and gear manipulating means for the bolts and means for locking the gear against movement, when desired.

A further object is to provide a wheel mounting of this character of simple and practical construction, efficient and reliable in performance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout and in which—

Figure 2 is a sectional view taken substantially on a line 2—2 of Figure 1.

Figure 3 is a front elevational view of the axle assembly.

Figure 4 is a side elevational view thereof, and

Figure 5 is a detail of one of the locking bolts.

Figure 1:
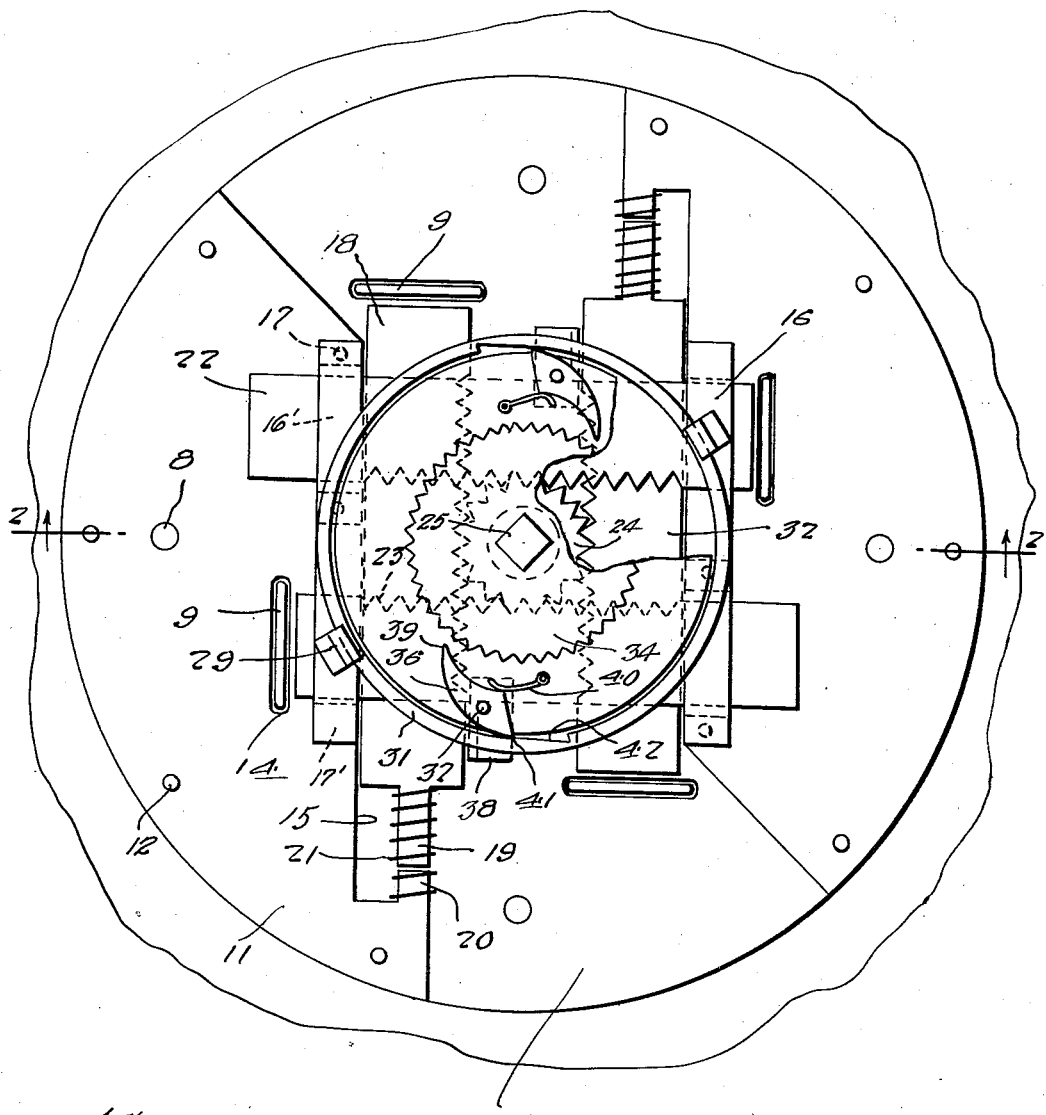
Figure 1 is a side elevational view of the hub portion of the wheel showing the locking mechanism.
Figure 6:
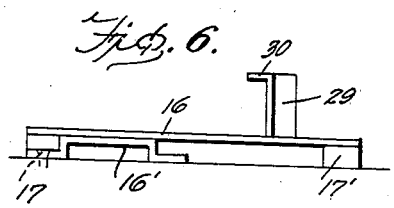
Figure 6 is a detail of one of the guide plates.

Referring now to the drawings in detail, the numeral 5 designates an axle assembly generally which includes a tubular axle 6 having a flanged disk 7 formed at its outer end, the outer surface of the disk being provided with a plurality of lugs 8 and a plurality of staples 9 projecting outwardly from the surface thereof.

The wheel to be mounted on the axle assembly preferably is of the disk type, the disk being indicated at 10 and having a pair of segmental plates 11 secured to its outer surface by rivets 12, the disk and plates being provided with aligned openings 13 for receiving the lugs 8 and a plurality of aligned slotted openings 14 for receiving the staples 9, the lugs being adapted to support the load.

The plates 11 have an edge 15 disposed in spaced parallelism with respect to each other and on the outer surface of the plates, adjacent said edge 15 is a guide 16, said guides being welded or otherwise secured to the outer surface of guide brackets 16', the latter being secured to the plate 11 by rivets 17. Shims 17' support the ends of the guide 16 in spaced relation from the plate 11. A pair of locking bolts 18 are positioned in spaced parallel relation against the outer surface of the disk 10 in the plane of the plates 11, and adjacent the edges 15 of said plates, one end of each of said bolts being movable into and out of engagement with one of the staples 9, the opposite end of the bolts being provided with a reduced extension 19 and an adjacent edge of the plates 11 being provided with extensions 20 in longitudinal alignment with the extensions 19 and on said extension is positioned a coil spring 21, one end of which abuts the bolt 19 and the other end of the spring in abutting engagement with the plate 11.

Mounted flatwise against the bolts 18, and outwardly thereof, is a pair of spaced parallel locking bolts 22 also slidably mounted under the guides 16 and brackets 16' and likewise having one end movable into and out of engagement with respect to one of the staples 9. As will be apparent from an inspection of Figure 1 of the drawings, the bolts 18 and 22 are arranged at right angles with respect to each other, substantially in the form of a square and have their inner edges formed with teeth 23. The teeth of each bolt are operatively engaged by a pinion 24 formed on a polygonal shaft 25, the inner end of the pinion being provided with a conical head 26 seated in a conical recess 27 of the disk 10 and secured therein by a plate 28.

A plurality of lugs 29 project outwardly from the guides 16, the outer ends of the lugs being bent inwardly as at 30 in overlying relation with respect to the outer edge of a ring member 31 freely positioned for rotary movement on the outer surface of the guides 16. Within the ring member is positioned a plate 32 having a central opening for receiving the hub portion 33 of a ratchet member 34, said ratchet member having a central opening for conformably receiving the shaft 25. A pair of locking pawls 36 are secured to the plate 32 by a pivot 37, the plate being anchored to a bracket 38 secured to the disk 10. One end of the pawl, indicated at 39, is adapted for engagement with the teeth of the ratchet 34, and yieldably urged in position with respect thereto by a spring 40 while the other end of the pawl, indicated at 41, is engageable with a cam surface 42 formed on the inner periphery of the ring member 31. As will be apparent from an inspection of Figure 1 of the drawings, the pawls 36 are normally disengaged from the ratchet and when the ring member 31 has been moved into a position to allow the end 41 of the pawl to enter the cam surface 42 the spring 40 will move the end 39 of the pawl into engagement with the ratchet to lock the same against movement.

It will be apparent from the foregoing that with the pawls in a disengaged position, as shown in Figure 1, the shaft 25 is free to be manipulated to rotate the pinion 24 whereby to project each of the bolts 18 and 22 into engagement with their respective staples to lock the wheel in position on the hub assembly. After the wheel has been locked in position the ring member 31 may then be partially rotated to permit an engagement of the pawls 36 with the ratchet 34, thus securing the parts against unlocking movement.

It is believed the details of construction and manner of operation of the device will be readily understood from the foregoing without further detailed explanation.

Having thus described the invention, what we claim is:

1. A wheel mounting comprising an axle assembly including a disk, a plurality of staples projecting outwardly from the disk, a wheel also embodying a disk having slotted openings for receiving said staples, bolts slidably carried by the wheel and means for manipulating said bolts into and out of position with respect to said staples to lock the wheel to said axle assembly, said manipulating means embodying racks formed on the bolts, a pinion rotatably carried by the disk of the wheel and a shaft projecting from the pinion for operating the same.

2. A wheel mounting comprising an axle assembly including a disk, a wheel also embodying a disk having slotted openings therein, staples projecting outwardly from the disk of the axle assembly through said openings, guides carried by the disk of the wheel, bolts slidably mounted in said guides and movable into and out of engagement with respect to said staples, racks carried by said bolts, a pinion rotatably carried by the disk of the wheel and engaged with said racks for moving said bolts into and out of engaged position with respect to said staples and a pawl and ratchet mechanism adapted to secure said pinion against movement.

3. A wheel mounting comprising an axle assembly including a disk, a wheel also embodying a disk having slotted openings therein, staples projecting outwardly from the disk of the axle assembly through said openings, guides carried by the disk of the wheel, bolts slidably mounted in said guides and movable into and out of engagement wtih respect to said staples, racks carried by said bolts, a pinion rotatably carried by the disk of the wheel and engaged with said racks for moving said bolts into and out of engaged position with respect to said staples, a pawl and ratchet mechanism adapted to secure said pinion against movement and a rotatable ring member having camming engagement with the pawl to release the pawl from the ratchet.

WARREN P. WOODS.
WALTER E. SMITH.